(12) United States Patent
Yuan

(10) Patent No.: US 9,069,978 B2
(45) Date of Patent: Jun. 30, 2015

(54) DATA STORAGE DEVICE AND DATA PROTECTION METHOD

(71) Applicant: Silicon Motion, Inc., Jhubei, Hsinchu County (TW)

(72) Inventor: Jingcheng Yuan, Jhubei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 139 days.

(21) Appl. No.: 13/891,324

(22) Filed: May 10, 2013

(65) Prior Publication Data

US 2013/0305061 A1     Nov. 14, 2013

Related U.S. Application Data

(60) Provisional application No. 61/645,977, filed on May 11, 2012.

(30) Foreign Application Priority Data

Mar. 28, 2013   (TW) .............................. 102111088 A

(51) Int. Cl.
 *G06F 21/60* (2013.01)
(52) U.S. Cl.
 CPC .................................. *G06F 21/602* (2013.01)
(58) Field of Classification Search
 None
 See application file for complete search history.

(56) References Cited

U.S. PATENT DOCUMENTS

| | | | |
|---|---|---|---|
| 6,158,004 A | 12/2000 | Mason et al. | |
| 6,490,685 B1 | 12/2002 | Nakamura | |
| 2005/0141011 A1* | 6/2005 | Han et al. | 358/1.14 |
| 2009/0089593 A1* | 4/2009 | Kuno et al. | 713/193 |
| 2009/0196417 A1 | 8/2009 | Beaver et al. | |
| 2012/0079289 A1 | 3/2012 | Weng et al. | |
| 2012/0239943 A1* | 9/2012 | Okamoto | 713/193 |

FOREIGN PATENT DOCUMENTS

| | | |
|---|---|---|
| JP | 11-3284 | 1/1999 |
| JP | 11-175403 | 7/1999 |
| JP | 2009-225437 | 10/2009 |

(Continued)

OTHER PUBLICATIONS

English language machine translation of TW I271618 (published Jan. 21, 2007).

(Continued)

*Primary Examiner* — David Le
(74) *Attorney, Agent, or Firm* — McClure, Qualey & Rodack, LLP

(57) ABSTRACT

A flash memory includes a plurality of blocks. A controller encrypts a first file to produce a first encrypted file and stores the first encrypted file to the flash memory, wherein the controller further comprises a key generation module, an encryption/decryption module and a key eliminating module. The key generation module produces a first key according to a first write command of a host device, wherein the first key is stored in a first block of the blocks. The encryption/decryption module encrypts the first file according to the first key to produce a first encrypted file, wherein the first encrypted file is stored in at least one second block of the blocks. The key eliminating module deletes the first key stored in the first block according to a first eliminating command in order to invalidate the first encrypted file stored in the second block.

17 Claims, 3 Drawing Sheets

(56) References Cited

FOREIGN PATENT DOCUMENTS

| JP | 2012-84043 | 4/2012 |
|----|------------|--------|
| TW | I271618 | 1/2007 |
| TW | 201214445 | 4/2012 |

OTHER PUBLICATIONS

English language machine translation of TW 201214445 (published Apr. 1, 2012).

English language translation of abstract of JP 11-3284 (published Jan. 6, 1999).

English language translation of abstract of JP 11-175403 (published Jul. 2, 1999).

English language translation of abstract of JP 2009-225437 (published Oct. 1, 2009).

English language translation of abstract of JP 2012-84043 (published Apr. 26, 2012).

* cited by examiner

DATA STORAGE DEVICE AND DATA PROTECTION METHOD

CROSS REFERENCE TO RELATED APPLICATIONS

This application claims the benefit of U.S. Provisional Application No. 61/645,977, filed May. 11, 2012, the entirety of which is/are incorporated by reference herein. Furthermore, this Application claims priority of Taiwan Patent Application No. 102111088, filed on Mar. 28, 2013, the entirety of which is incorporated by reference herein.

BACKGROUND OF THE INVENTION

1. Field of the Invention

The present invention relates to a data storage device, and in particular, relates to a data storage device for encrypting data.

2. Description of the Related Art

The flash memory is one kind of non-volatile memory that can be erased electrically and can be re-programmed, and it is mainly implemented in memory cards, USB flash drives, eMMCs, or solid-state disks for storing data and transmitting data between computer systems and the digital products.

A flash memory may comprise multiple memory blocks and each memory block has multiple storing pages for storing data. Flash memories erase data in one memory block unit and program data in one storing page unit. However, the data stored in the flash memory may not be erased after users delete the data. Therefore, the deleted data may be accessed by unauthorized users, hindering information security.

BRIEF SUMMARY OF THE INVENTION

A detailed description is given in the following embodiments with reference to the accompanying drawings.

The present invention discloses a data storage device including a flash memory and a controller. The flash memory includes a plurality of blocks. The controller encrypts a first file to produce a first encrypted file and stores the encrypted first file to the flash memory, wherein the controller further comprises a key generation module, an encryption/decryption module and a key eliminating module. The key generation module is arranged to produce a first key according to a first write command of a host device, wherein the first key is arranged to be stored in a first block of the blocks. The encryption/decryption module is arranged to encrypt the first file according to the first key to produce a first encrypted file, wherein the first encrypted file is arranged to be stored in at least one second block of the blocks. The key eliminating module is arranged to delete the first key stored in the first block according to a first eliminating command in order to invalidate the first encrypted file stored in the second block.

The present invention further discloses a data protection method including: producing a first key according to a first write command of a host device and storing the first key in a first block; encrypting a first file according to the first key to produce a first encrypted file and storing the first encrypted file in at least one second block; and erasing the first block to delete the first key according to a first eliminating command for invalidating the first encrypted file stored in the second block.

The present invention further discloses a data protection method including: receiving a first write command and a first file; producing a first key according to the first write command; encrypting a first file according to the first key to produce a first encrypted file; storing the first key in a first block, and storing the first encrypted file in at least one second block; and deleting the first key and retaining the first encrypted file when a first eliminating command has been received.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
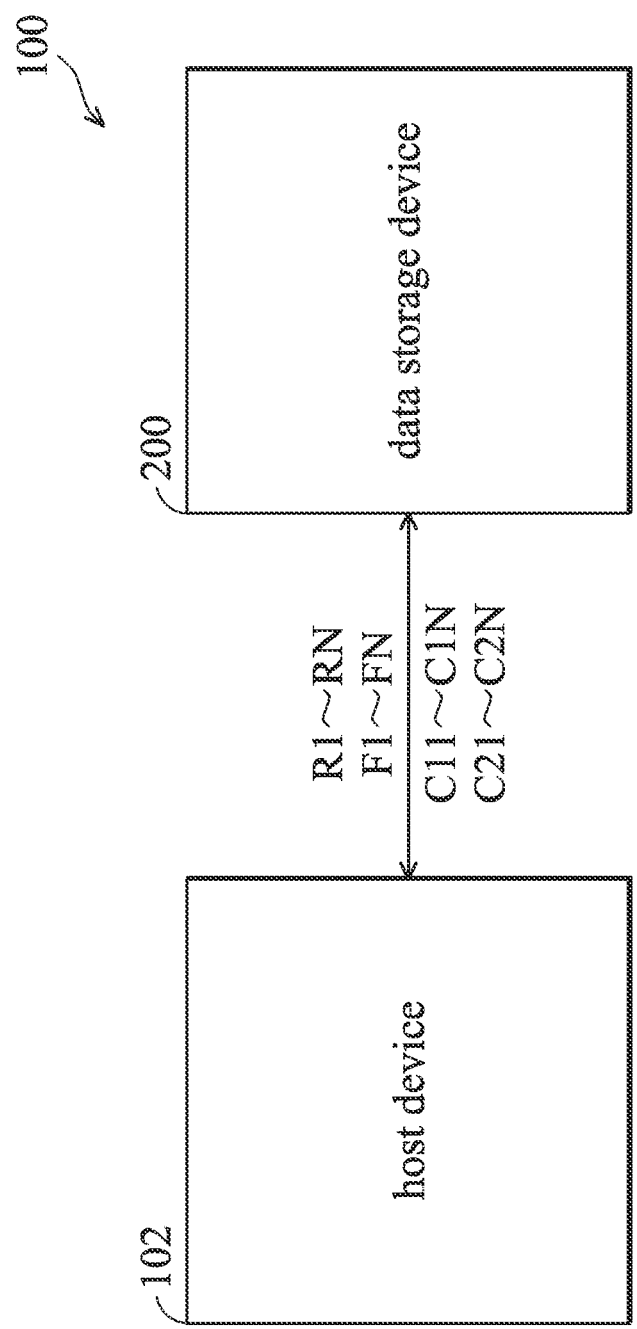
FIG. 1 is a schematic diagram illustrating an embodiment of a storage system of the present invention.

FIG. 1 is a schematic diagram illustrating an embodiment of a storage system of the present invention. The storage system 100 includes a host device 102 and a data storage device 200, such as a solid state drive (SSD), SD card or flash drive. The host device 102 is arranged to transmit at least one files F1-FN, at least one write commands C11-C1N, at least one eliminating commands C21-C2N and at least one read commands R1-RN. The data storage device 200 is arranged to encrypt and store the file(s) F1-FN according to the corresponding write command(s) C11-C1N. The data storage device 200 is further arranged to delete the corresponding key of the file(s) F1-FN according to the corresponding eliminating command(s) C21-C2N, and transmit the stored file(s) F1-FN to the host device 102 according to the corresponding read command(s) R1-RN.

Figure 2:
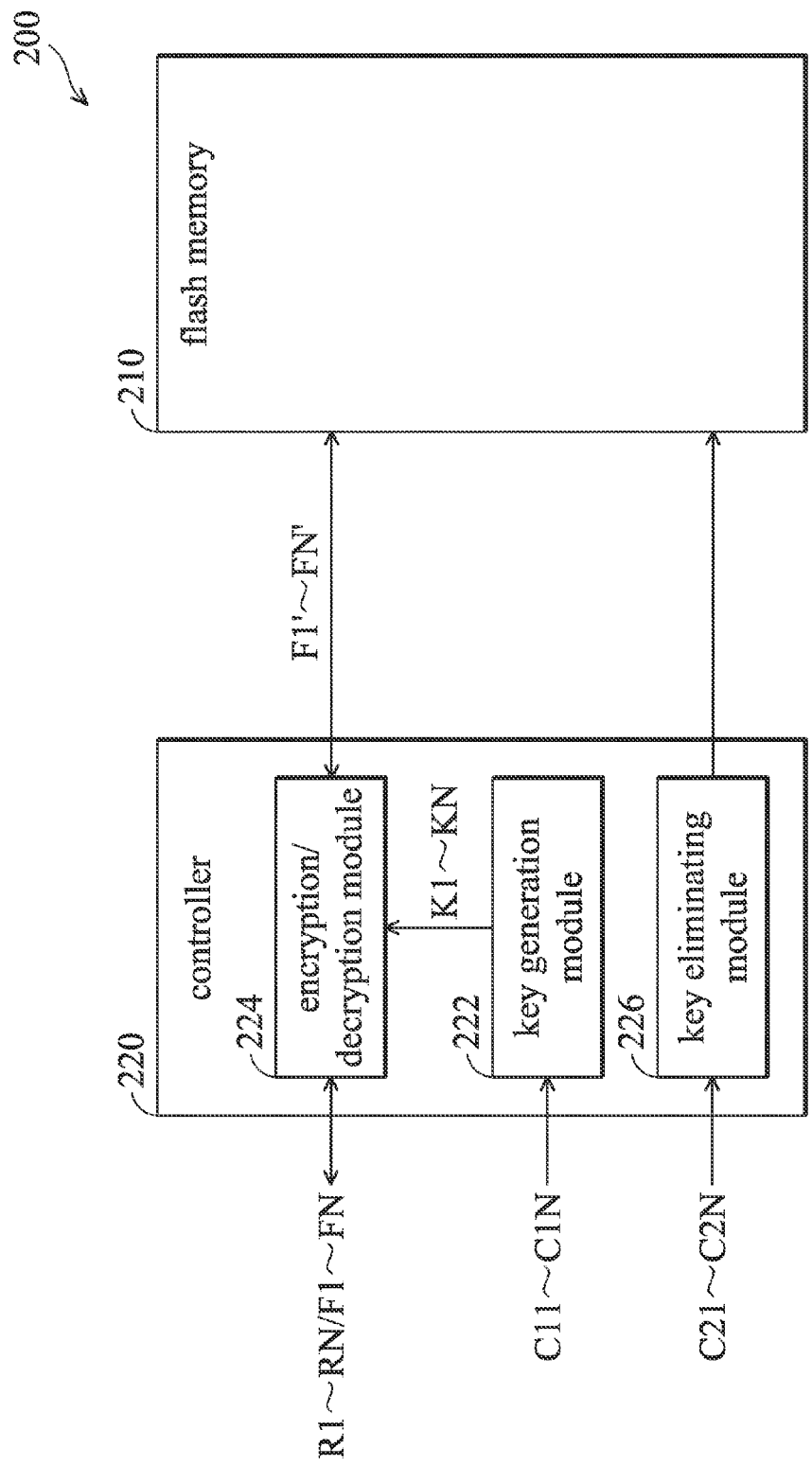
FIG. 2 is a schematic diagram illustrating an embodiment of a data storage device of the present invention.

FIG. 2 is a schematic diagram illustrating an embodiment of a data storage device of the present invention. The data storage device 200 includes a flash memory 210 and a controller 220. The flash memory 210 is arranged to store the file(s) F1-FN and/or the at least one encrypted file(s) F1'-FN'. It should be noted that the flash memory 210 includes a plurality of memory units (not shown), each of the memory unit includes a plurality of blocks (not shown), and each of the blocks includes a plurality of pages (not shown). The controller 220 is arranged to encrypt the file(s) F1-FN according to the write command(s) C11-C1N to produce the encrypted file(s) F1'-FN', respectively, and store the encrypted file(s) F1'-FN' in the flash memory 210. The controller 220 is further arranged to invalidate the encrypted file(s) F1'-FN' stored in the flash memory 210 according to the eliminating command(s) C21-C2N, decrypt the encrypted file(s) F1'-FN' according to the read command(s) R1-RN, and transmit the decrypted file(s) F1-FN to the host device 102. Moreover, the controller 220 further includes a key generation module 222, an encryption/decryption module 224 and a key eliminating module 226.

The key generation module 222 is arranged to produce the key(s) K1-KN according to the write command(s) C11-C1N received form the host device 102, respectively. The key generation module 222 is further arranged to transmit the key(s) K1-KN to the encryption/decryption module 224, and store the key(s) K1-KN in the blocks of the flash memory 210. It should be noted that each of the key(s) K1-KN is arranged to encrypt and decrypt the data stored in the different blocks, respectively, wherein the number of the block(s) corresponding to the different key(s) K1-KN is determined by the write command(s) C11-C1N, respectively, but it is not limited thereto. For example, the key generation module 222 produces the key K1 according to the write command C11, wherein the key K1 is arranged to encrypt a first predetermined quantity of data, and the first predetermined quantity of data requires 3 blocks to be stored. Therefore, the key 1 corresponds to three blocks of the flash memory. Namely, the key K1 is arranged to encrypt and decrypt the data stored in the fifth block, the sixth block and the seventh block of the flash memory 210. In one of the embodiments of the present invention, the write command(s) C11-C1N is arranged to determine the number of block(s) corresponding to the at least one key(s) K1-KN according to a predetermined length. In another embodiment of the present invention, the write command(s) C11-C1N is arranged to determine the number of the block(s) corresponding to the key(s) K1-KN according to the length of the file(s) F1-FN, respectively.

It should be noted that the key generation module 222 is arranged to store the key(s) K1-KN into different blocks or into one block, but it is not limited thereto. For example, the key generation module 222 produces a key K1 according to the write command C11 received from the host device 102, and stores the key K1 in a first block of the flash memory 210. Next, the key generation module 222 produces a key K2 according to the write command C12 received from the host device 102, and stores the key K2 in the first block of the flash memory 210. Therefore, the key K1 and Key K2 will be deleted by erasing the first block by the controller 220 if the controller 220 receives the eliminating command C21. Namely, the controller 220 erases the first block to delete the key(s) K1-KN when receiving the eliminating command C21. In another embodiment of the present invention, the key generation module 222 produces a key K1 according to a write command C11 received from the host device 102, and stores the key K1 in a first block of the flash memory 210. Next, the key generation module 222 produces a key K2 according to a write command C12 received from the host device 102, and stores the key K2 in a third block of the flash memory 210. In this embodiment, users can delete the key K1 or the key K2 by erasing the first block or the third block, respectively.

The encryption/decryption module 224 is arranged to encrypt the file(s) F1-FN according to the corresponding key(s) K1-KN to produce the encrypted file(s) F1'-FN', respectively, wherein the encrypted file(s) F1'-FN' is arranged to be stored in the block(s) of the flash memory 210. For example, the encryption/decryption module 224 can encrypt the file(s) F1-FN according to the key(s) K1-KN by Advanced Encryption Standard (AES), but it is not limited thereto. In other embodiments, the encryption/decryption module 224 is further arranged to encrypt the file(s) F1-FN by the Data Encryption Standard (DES) or the Triple Data Encryption Standard (3DES). It should be noted that the encrypted file(s) F1'-FN' can be stored with the key(s) K1-KN in the same block(s), or stored in the block different from the block(s) with the key(s) K1-KN, but it is not limited thereto. In a better embodiment of the present invention, the encrypted file(s) F1'-FN' and the key(s) K1-KN are arranged to be stored in different blocks. Moreover, the encrypted file(s) F1'-FN' can be written into the flash memory 210 by page unit or block unit, but is not limited thereto. The encryption/decryption module 224 is further arranged to decrypt the encrypted file(s) F1'-FN' stored in the flash memory 210 according to the corresponding key(s) K1-KN stored in the block(s) to obtain the file(s) F1-FN, respectively, and transmit the file(s) F1-FN to the host device 102. For example, the encryption/decryption module 224 locates the encrypted file F1' according to a read command R1 when the controller 220 receives the read command R1, and retrieves the corresponding key K1 according to the address of the encrypted file F1' or directly according to the encrypted file F1'. For example, the flash memory 210 can further include a mapping table used to record the mapping relation of the address(es) of the encrypted file(s) F1'-FN' and the key(s) K1-KN or the mapping relation of the encrypted file(s) F1'-FN' and the key(s) K1-KN. Next, the encryption/decryption module 224 can decrypt the encrypted file F1' according to the key K1 to obtain the file F1, and transmit the file F1 to the host device 102.

The key eliminating module 226 deletes the key(s) K1-KN stored in the block(s) according to the corresponding eliminating command(s) C21-C2N in order to invalidate the encrypted file(s) F1'-FN'. Namely, the key eliminating module 226 is arranged to erase the block(s) having the key(s) K1-KN according to the corresponding eliminating command(s) C21-C2N, such unauthorized users will not be able to encrypt the encrypted file(s) F1'-FN' by the key(s) K1-KN. Therefore, the encrypted file(s) F1'-FN' will be invalid. In another embodiment, the key eliminating module 226 is arranged to overwrite the block(s) having the key(s) K1-KN with invalid data according to the corresponding eliminating command(s) C21-C2N. When the block(s) has(have) been overwritten, the corresponding key(s) K1-KN will be destroyed, such that unauthorized users will not be able to encrypt the encrypted file(s) F1'-FN' by the key(s) K1-KN.

Figure 3:
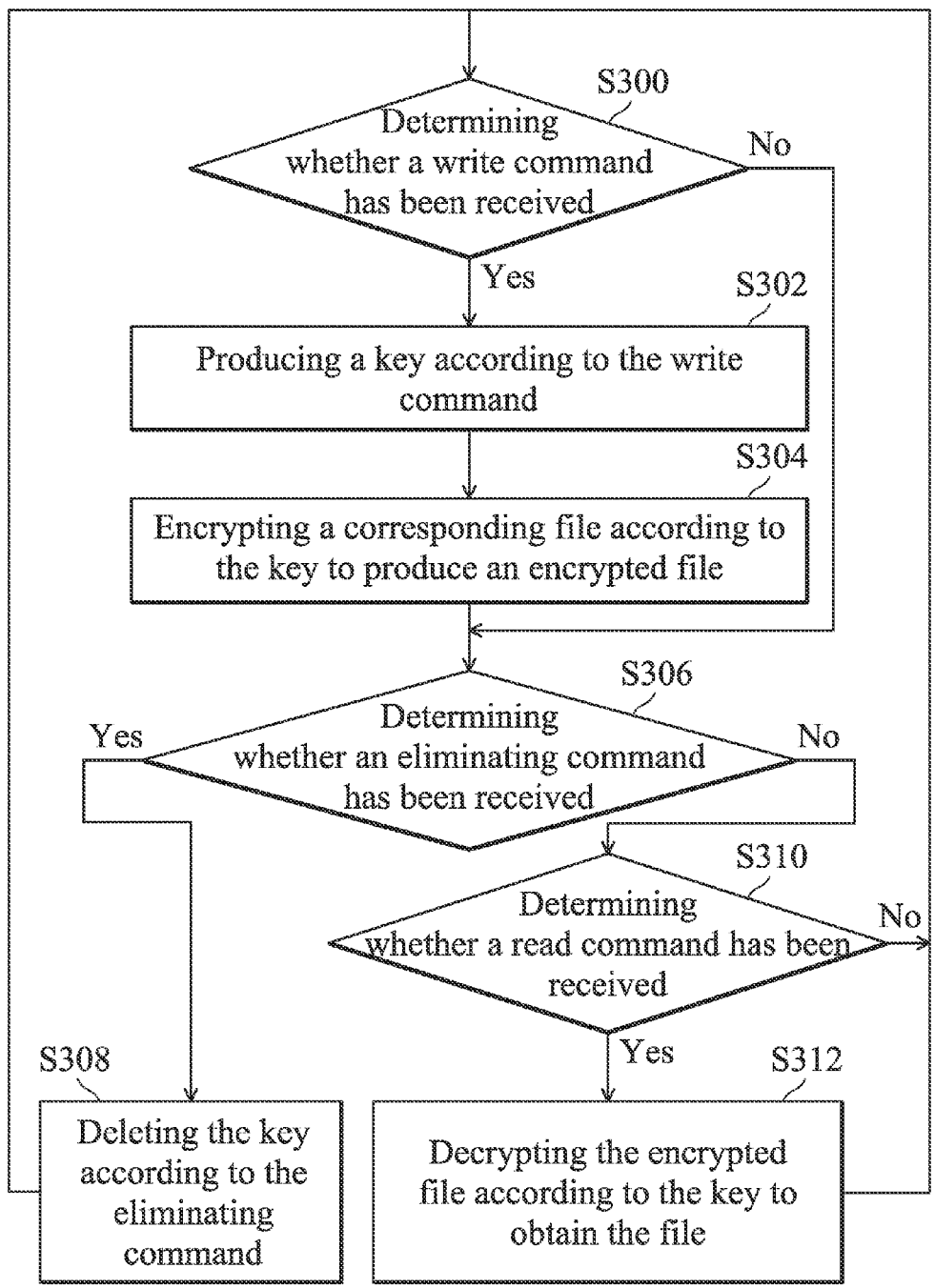
FIG. 3 is a flowchart of a data protection method according to an embodiment of the present invention.

FIG. 3 is a flowchart of a data protection method according to an embodiment of the present invention. The data protection method is applied to the data storage device 200 of FIG. 2. The process starts at step S300.

In step S300, the data storage device 200 determines whether a write command has been received. If the write command has been received, the process goes to step S302, otherwise, the process goes to step S306.

In step S302, the key generation module 222 is arranged to produce a key according to the write command received form the host device 102, and transmit the key to the encryption/decryption module 224 to store in the block(s) of the flash memory 210. It should be noted that each of the key(s) K1-KN is arranged to encrypt and decrypt the data stored in the different blocks, respectively, wherein the number of the block(s) corresponding to the different key(s) K1-KN is determined by the write command(s) C11-C1N, respectively, but it is not limited thereto. For example, the key generation module 222 produces the key K1 according to the write command C11, wherein the key K1 is arranged to encrypt the data with a first predetermined quantity, and the first predetermined quantity requires 3 blocks to be stored. Therefore, the key K1 is arranged to encrypt and decrypt the data stored in the fifth block, the sixth block and the seventh block of the flash memory 210. In one of the embodiments of the present invention, the write command(s) C11-C1N is arranged to determine the number of block(s) corresponding to the at least one key(s) K1-KN according to a predetermined length. In another embodiment of the present invention, the write command(s) C11-C1N is arranged to determine the number of the block(s) corresponding to the key(s) K1-KN according to the length of the file(s) F1-FN, respectively. Moreover, the key generation module 222 is arranged to store the key(s) K1-KN into different blocks or into the same block, but it is not limited thereto. For example, the key generation module 222 produces a key K1 according to the write command C11 received from the host device 102, and stores the key K1 in a first block of the flash memory 210. Next, the key generation module 222 produces a key K2 according to the write command C12 received from the host device 102, and stores the key K2 in the first block of the flash memory 210. It should be noted that, in this embodiment, the key(s) stored in the same block will be deleted, simultaneously, due to the flash memory being in the block erasing mode. In another embodiment of the present invention, the key generation module 222 produces a key K1 according to a write command C11 received from the host device 102, and stores the key K1 in a first block of the flash memory 210. Next, the key generation module 222 produces a key K2 according to a write command C12 received from the host device 102, and stores the key K2 in a third block of the flash memory 210. In this embodiment, users can delete the key K1 or the key K2 by erasing the first block or the third block, respectively.

Next, in step S304, the encryption/decryption module 224 is arranged to encrypt a corresponding file according to the key to produce an encrypted file, and the controller 220 is arranged to store the encrypted file in the block(s) of the flash memory 210. It should be noted that the encrypted file(s) F1'-FN' can be stored with the key(s) K1-KN in the same block(s), or stored in the block(s) different from the block(s) with the key(s) K1-KN, but it is not limited thereto. In a better embodiment of the present invention, the encrypted file(s) F1'-FN' and the key(s) K1-KN are arranged to be stored in different blocks. Moreover, the encrypted file(s) F1'-FN' can be written into the flash memory 210 by page mode or block mode, but is not limited thereto.

Next, in step S306, the data storage device 200 determines whether an eliminating command has been received. When the eliminating command has been received, the process goes to step S308, otherwise, the process goes to step S310.

In step S308, the key eliminating module 226 deletes the key stored in the block(s) according to the eliminating command in order to invalidate the encrypted file. Namely, the key eliminating module 226 is arranged to erase the block(s) having the key(s) K1-KN according to the corresponding eliminating command(s) C21-C2N, such that unauthorized users will not be able to encrypt the encrypted file(s) F1'-FN' by the key(s) K1-KN. Therefore, the encrypted file(s) F1'-FN' will be invalid. Next, the process backs to step S300, wherein the data storage device 200 continues to determine whether a write command has been received.

In step S310, the data storage device 200 determines whether a read command has been received. When the read command has been received, the process goes to step S312, otherwise, the process goes to step S300, wherein the data storage device 200 continues to determine whether a write command has been received.

In step S312, the encryption/decryption module 224 is arranged to decrypt the encrypted file(s) F1'-FN' stored in the flash memory 210 according to the corresponding key(s) K1-KN stored in the block(s) to obtain the file(s) F1-FN, respectively, and transmit the file(s) F1-FN to the host device 102. For example, the encryption/decryption module 224 locates the address of the encrypted file F1' according to a read command R1 when the controller 220 receives the read command R1, and retrieves the corresponding key K1 according to the address of the encrypted file F1' or directly according to the encrypted file F1'. For example, the flash memory 210 can further include a mapping table used to record the mapping relation of the address(es) of the encrypted file(s) F1'-FN' and the key(s) K1-KN or the mapping relation of the encrypted file(s) F1'-FN' and the key(s) K1-KN. Next, the encryption/decryption module 224 can decrypt the encrypted file F1' according to the key K1 to obtain the file F1, and transmit the file F1 to the host device 102.

The data storage device 200 and the data protection method disclosed by the present invention can invalidate the stored file(s) by deleting or destroying the encryption key.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
   a flash memory, comprising a plurality of blocks; and
   a memory controller, encrypting a first file to produce a first encrypted file and store the first encrypted file to the flash memory, wherein the controller further comprises:
   a key generation module, producing a first key according to a first write command of a host device, wherein the first key is arranged to be stored in a first block of the blocks;
   an encryption/decryption module, encrypting the first file according to the first key to produce a first encrypted file, wherein the first encrypted file is arranged to be stored in at least one second block of the blocks; and
   a key eliminating module, deleting the first key stored in the first block according to a first eliminating command in order to invalidate the first encrypted file stored in the second block, wherein the number of the at least one second block is determined by the first write command and a predetermined length.

2. The data storage device as claimed in claim 1, wherein the memory controller encrypts a second file and store the second encrypted file in the flash memory, and the key generation module produces a second key according to a second write command of the host device, wherein the second key is arranged to be stored in the first block or a third block of the blocks, the encryption/decryption module encrypts the second file according to the second key to produce a second encrypted file and stores the second encrypted file in at least one fourth block of the blocks, and the key eliminating module deletes the second key stored in the first block or the third block.

3. The data storage device as claimed in claim 2, wherein the encryption/decryption module decrypts the first encrypted file according to the first key stored in the first block to obtain the first file, decrypts the second encrypted file according to the second key stored in the first block or the third block to obtain a second file, and transmits the first file and the second file to the host device, respectively.

4. The data storage device as claimed in claim 3, wherein the first key is arranged to encrypt and decrypt data stored in the at least one second block, and the second key is arranged to encrypt and decrypt data stored in the at least one fourth block, wherein the number of the at least one fourth block is determined by the second write command.

5. The data storage device as claimed in claim 4, wherein the second write command is arranged to determine the number of the at least one fourth block according to the predetermined length.

6. The data storage device as claimed in claim 4, wherein the second write command is arranged to determine the number of the at least one fourth block according to the length of the second file.

7. The data storage device as claimed in claim 1, wherein the key eliminating module erases the first block according to the first eliminating command in order to delete the first key.

8. A data protection method, comprising:
producing a first key according to a first write command of a host device, and storing the first key in a first block;
encrypting a first file according to the first key to produce a first encrypted file, and storing the first encrypted file in at least one second block, wherein the number of the at least one second block is determined by the first write command and a predetermined length; and
erasing the first block to delete the first key according to a first eliminating command for invalidating the first encrypted file stored in the second block.

9. As the data protection method as claimed in the claim 8, comprising:
producing a second key according to a second write command of the host device, and storing the second key in the first block or a third block;
encrypting a second file according to the second key to produce a second encrypted file, and storing the second encrypted file in at least on fourth block; and
deleting the second key stored in the first block or the third block according to a second eliminating command.

10. As the data protection method as claimed in the claim 9, further comprising decrypting the first encrypted file stored in the least one second block according to the first key stored in the first block to obtain the first file, decrypting the second encrypted file stored in the fourth block according to the second key stored in the first block or the third block to obtain the second file, and transmitting the first file and the second file to the host device.

11. As the data protection method as claimed in the claim 10, wherein the first key is arranged to encrypt and decrypt data stored in the at least one second block, and the second key is arranged to encrypt and decrypt data stored in the at least one fourth block, wherein the number of the least one fourth block is determined by the second write command.

12. As the data protection method as claimed in the claim 11, wherein the second write command is arranged to determine the number of the at least one fourth block according to the predetermined length.

13. As the data protection method as claimed in the claim 11, wherein the first write command is arranged to determine the number of the at least one second block according to the length of the first file, and the second write command is arranged to determine the number of the at least one fourth block according to the length of the second file.

14. A data protection method, comprising:
receiving a first write command and a first file;
producing a first key according to the first write command;
encrypting the first file according to the first key to produce a first encrypted file;
storing the first key in a first block, and storing the first encrypted file in at least one second block, wherein the number of the at least one second block is determined by the first write command and a predetermined length; and
deleting the first key and retaining the first encrypted file when a first eliminating command has been received.

15. As the data protection method as claimed in the claim 14, further comprising:
retrieving the first key and the first encrypted file when a first read command has been received from a host device;
decrypting the first encrypted file according to the first key to obtain the first file; and
transmitting the first file to the host device.

16. As the data protection method as claimed in the claim 14, wherein the step of deleting the first key, is erasing the first block.

17. As the data protection method as claimed in the claim 14, wherein the step of deleting the first key, is writing invalid data into the first block.

* * * * *